March 8, 1960 R. S. RUSSELL 2,927,456
SEAM TESTER FOR CONCRETE PIPE
Filed June 13, 1958 4 Sheets-Sheet 1
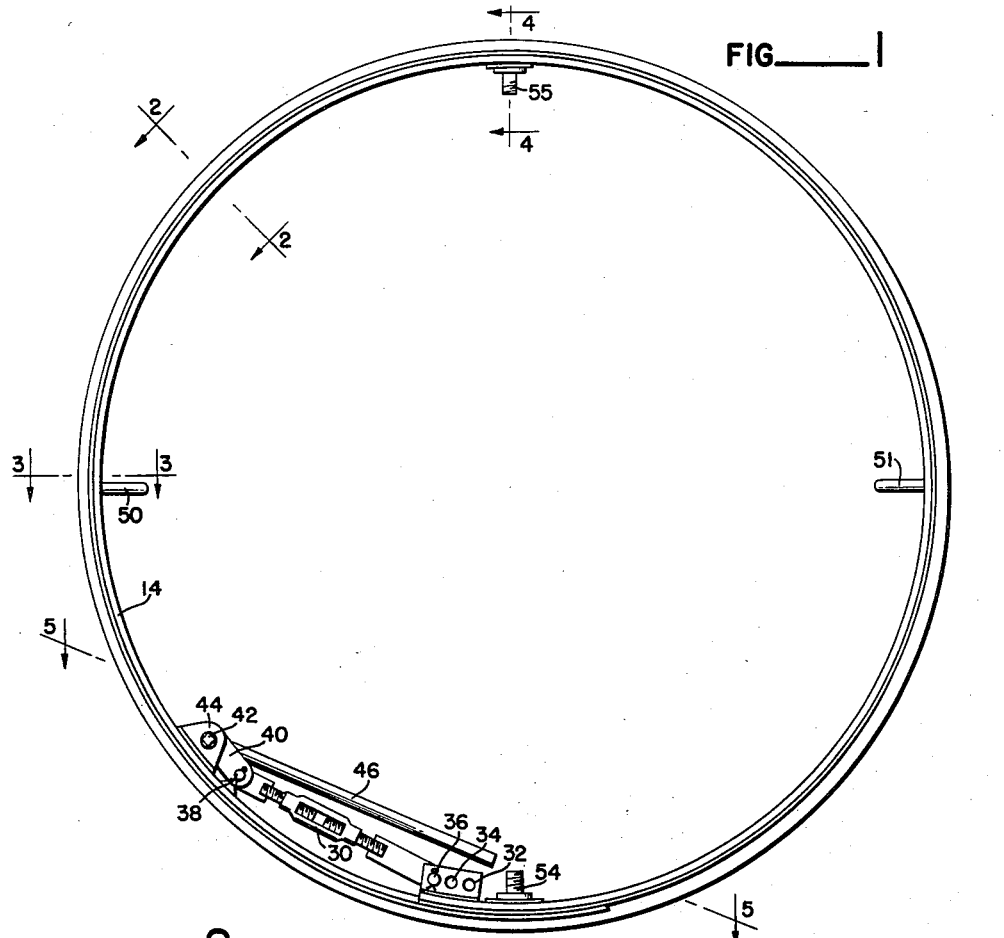
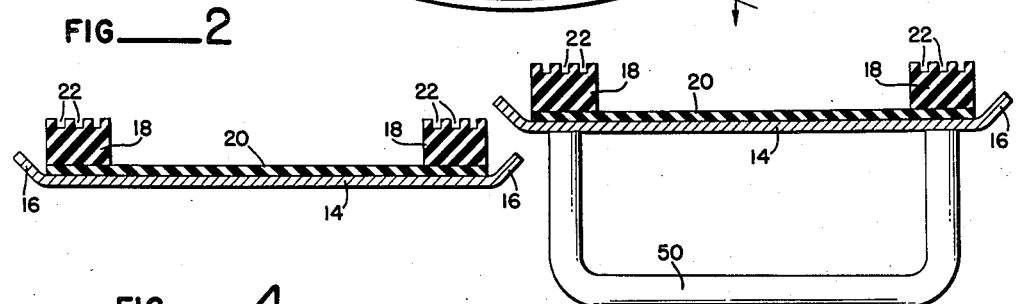
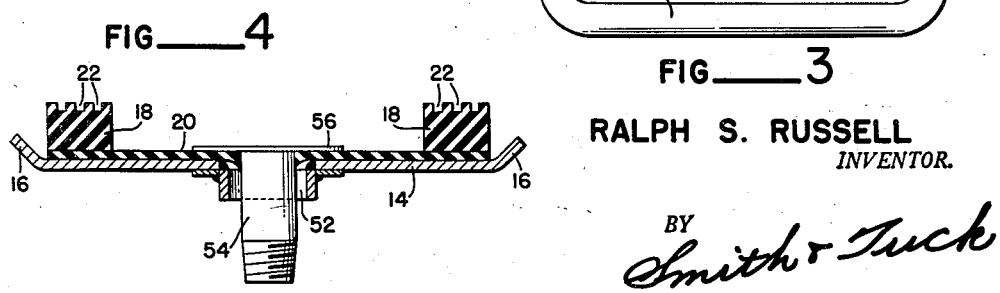
RALPH S. RUSSELL
*INVENTOR.*
BY *Smith & Tuck*

RALPH S. RUSSELL
INVENTOR.

BY Smith & Tuck

March 8, 1960 R. S. RUSSELL 2,927,456
SEAM TESTER FOR CONCRETE PIPE
Filed June 13, 1958 4 Sheets-Sheet 3
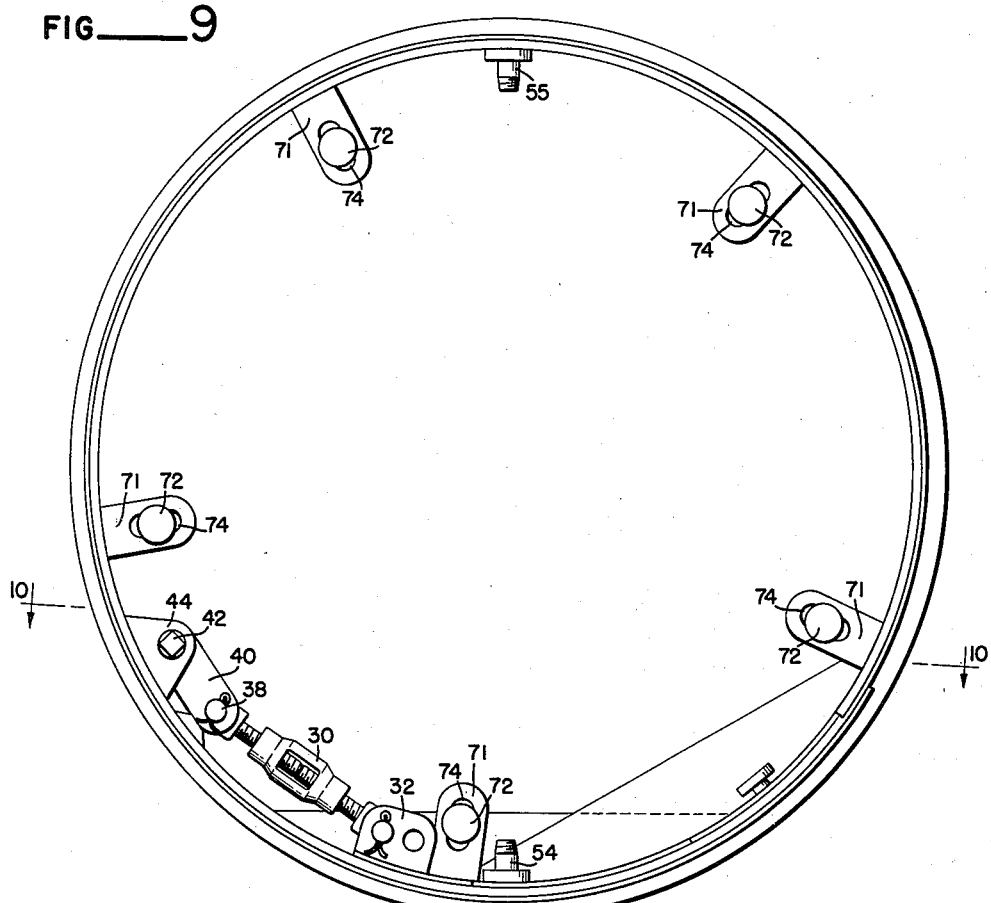
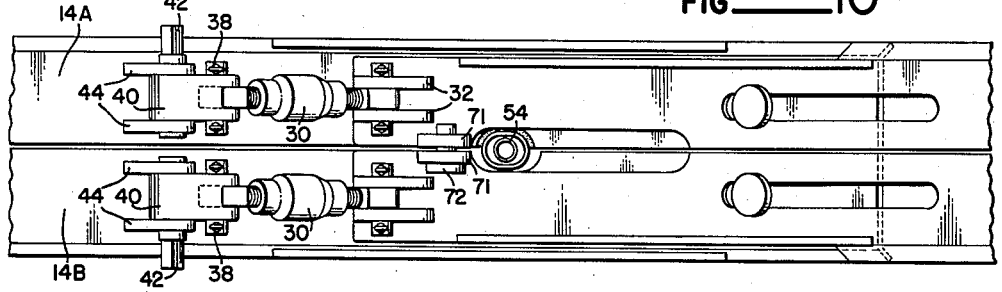
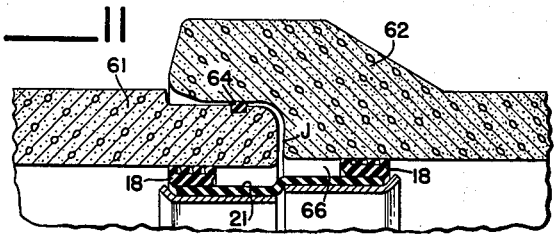
RALPH S. RUSSELL
*INVENTOR.*
BY Smith + Tuck

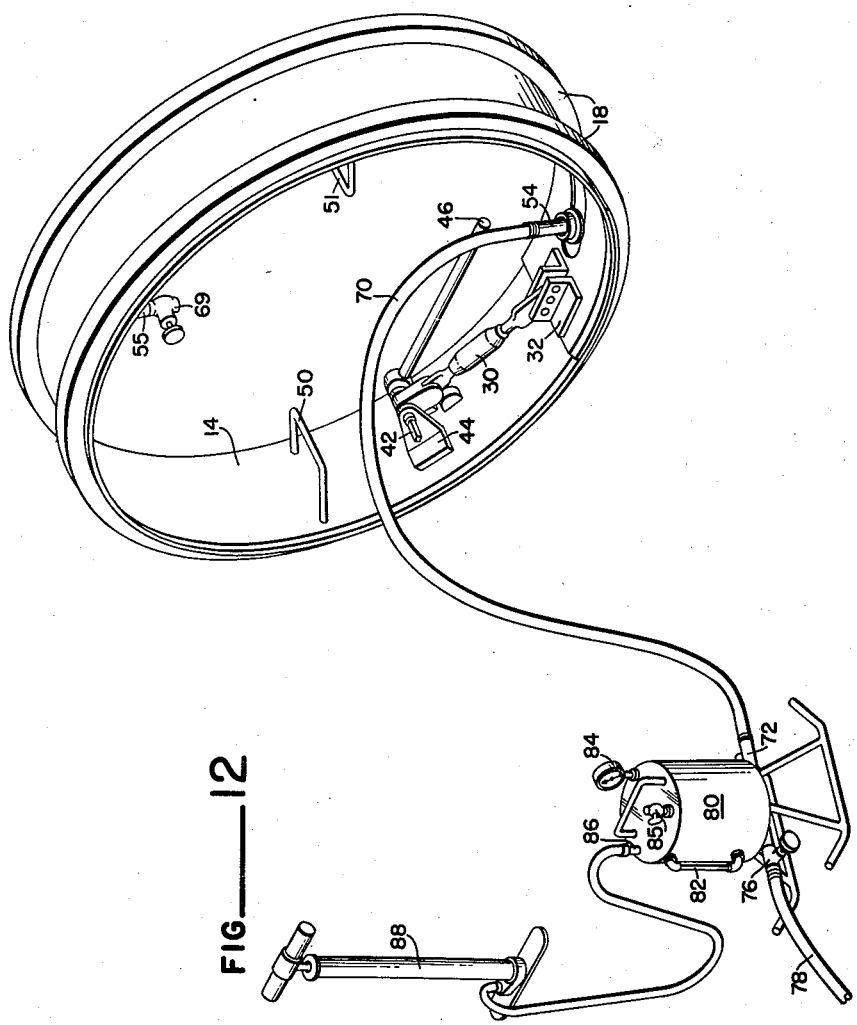

United States Patent Office 2,927,456
Patented Mar. 8, 1960

2,927,456

SEAM TESTER FOR CONCRETE PIPE

Ralph S. Russell, Bellevue, Wash., assignor to Hydraulic Supply Manufacturing Company, Seattle, Wash., a corporation of Washington Application June 13, 1958, Serial No. 741,938

4 Claims. (Cl. 73—46)

This present invention relates to testing equipment of the type used in testing the seams where concrete pipe joints are fitted together. More particularly, this invention relates to a device which seals off a portion of the inner surface of two mating concrete pipes with suitable gaskets, providing through suitable pressure means, water under such control that exact pressures in the lower ranges particularly may be applied.

Concrete pipe, especially, has established itself as the prime form of pipe for use in the majority of sewer work. While sewer trunk lines may employ pipe of various sizes it is usually within the range of 24 to 60 inches inside diameter. Pipe lines of this order normally are not intended to carry high pressures, but even in the lower range of three to five pounds pressure sometimes a leak will occur and this may, by undermining the support for the pipe itself, easily cause great damage. In one instance of record within the last two years, the breaking of a trunk sewer caused the opening of vast pit over a city block long, the full width of a city street, including the lawns in front of residences, and to a depth of approximately fifty feet. The actual material was carried away through the sewer itself so that finally the street collapsed into the void underneath. Experiences of this order therefore call for a more exact testing of pipe of this kind. This present invention provides a means of testing pipe to insure that pipe once put in place will be sound and this is the best possible insurance against sewer line problems. In the past the common method of testing sewer lines has been to take a stretch of many lengths of pipe, to seal both ends and to fill them with water and subjecting the water to what would normally be the maximum expected working pressure. Such tests have never been entirely satisfactory in that there is a marked tendency to move the pipe lengthwise as there is no backfilling in place and nothing but the dead weight of the pipe to hold it in position. This form of testing has been accepted with the small leakage at the joints often experienced as the pressure moves the pipe lengthwise. It is therefore believed that testing of this order is of very doubtful value and that instead, as a matter of economy to the contractor, and as a safeguard to the political subdivision responsible for the pipe, each joint should be individually tested. This present equipment provides a convenient means for making such tests.

The principal object of this present invention therefore is to provide means for testing the seam of joining of two sections of pipe under conditions that will subject the joint only to a predetermined and exact pressure.

A further object of this invention is to provide a conveniently operated expanding unit which will, when placed in a concrete pipe at the joint, seal off a portion of the interior wall of both joints of pipe and then permit the building up of exactly controlled pressure in this sealed off portion.

A further object of this invention is to provide a seam tester for concrete pipe that is characterized by lightness, ease of handling and economy in first cost.

A further object of this invention is to provide a means of seam testing for concrete pipe which employs a gas, as air, so that absolute control of the relatively low pressures can be easily achieved.

An object is to provide a seam tester which will test joints of pipe which do not have their inner walls aligned.

Further objects, advantages and capabilities will be apparent from the description and disclosure in the drawings, or may be comprehended or are inherent in the device.

Figure 1 is an end elevation of one form of expander used in carrying out my pipe testing method.

Figures 2, 3 and 4 are cross-sectional views

Figure 9 is a view of my seam tester expander and showing a double unit arranged to accommodate a joining of concrete pipe of slightly different inside diameter and of a degree greater than the resilient gasket material can seal, using the device of Figure 1.

Figure 10 is a cross-sectional view taken along the line 10—10 of Figure 9.

Figure 11 is a view similar to Figure 7 but illustrating a step type of expander and illustrating the manner in which it seals two joining concrete pipe sections of different inside diameter. Also pipes are theoretically the same inside diameter but due to errors in manufacture are not perfectly round but some are egg shaped.

Figure 12 is a perspective view illustrating the manner in which my equipment is put into use.

Figure 5:
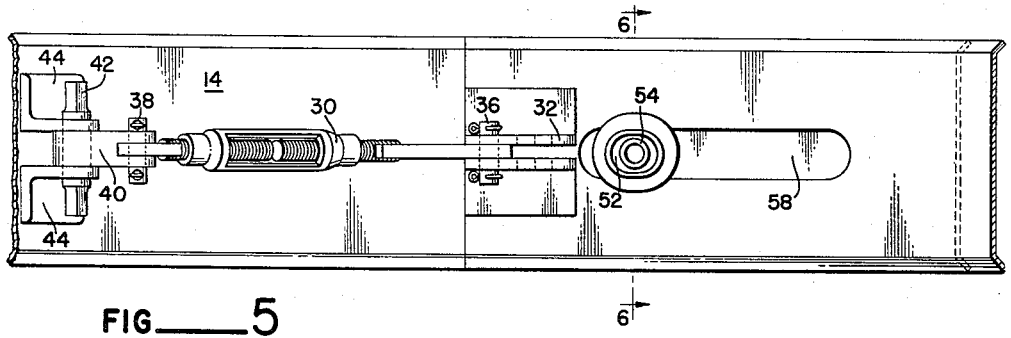
Figure 5 is taken along the chord designated by 5—5 in Figure 1.

Referring to the drawings, throughout which like reference characters indicate like parts, numeral 14 designates the expander band. This is formed of sheet metal or steel plate, depending upon the size constructed, and is further provided with outwardly turned peripheral flanges 16, normally angularly disposed, instead of at right angles to the band proper, for the purpose of giving backing and strength to the band. This arrangement may support considerable internal pressure and still be resilient enough to permit expanding it by the expedient of moving its overlapping ends in the direction away from each other and thus enable the expander to fit the inside of the concrete pipe being tested so as to provide adequate pressure to insure operational seating of the annular sealing strips 18. Sealing strips 18 are preferably formed of very resilient material such as pure gum rubber, and in order to provide additional resiliency, peripheral grooves are provided throughout the length of the strips. Strips 18 are held in position on a sealing sheet 20 in order to form a watertight assembly. Rubber sheet 20 is disposed to slip on band 14 to provide equal expansion for tire 18 entirely around band 14.

In order to provide, on one hand, a convenient means of collapsing band 14 and expanding it with considerable force, I have provided the toggle locking means as shown in Figures 1 and 9. This consists in one exemplary form, essentially of a turnbuckle 30 having an extension on one end which is pivotally secured in the adjustable anchor means shown at 32. This provides a plurality of adjusting holes 34 through which a suitable bolt or pin 36 may be passed. This pin is secured against longitudinal movement by cotter pins as a convenient means. Having a plurality of openings in the channel arrangement 32, a single band can be given a reasonable range of adjustability so that it may fit variations in a given size of pipe. The other end of the turnbuckle is pivotably secured at 38 to the toggle bar 40. Toggle bar 40 is pivotably secured at 42 in a pivot 44 which in turn is fixedly secured to the inner surface of band 14. A suitable toggle lever 46 is provided. The general proportions of a satisfactory arrangement are shown in Figures 1 and 9, it being desirable to take advantage of the locking properties of a toggle arrangement by having pivot point 38 go towards the rim and beyond the line joining pins 36 and 32. For ordinary use the toggle arrangement should be provided so proportioned as to be capable of providing from four to six inches of relative movement for the two ends of band 14, for the pipe sizes indicated in this general example or embodiment of the invention. There are other means of expansion that may be appropriate for use and on certain other types of pipe.

Figure 6:
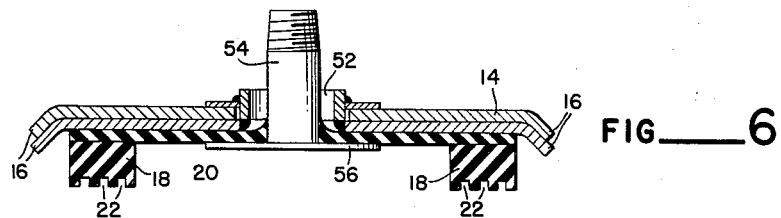
Figure 6 is a cross-sectional view along the lines 6—6 of Figure 5.

As a matter of convenience, maneuvering handles are provided at 50 and 51 on opposite sides of the end on a diameter that should be considered as being usually normally horizontal. The inner surface of band 14 is also provided with two nipples, the general construction of which is indicated in the Figures 4 and 6. A shielding opening 52 is provided in the inner surface of band 14 through which the nipples 54 and 55 extend. The nipples themselves are fixedly secured to a thin flange as 56, which flange, in turn is secured as by cementing thereto and covered by rubber to the sealing sheet 20. It is to be noted that where the lower nipple 54 occurs, the two ends of band 14 overlap and this requires a slot as at 58 to take care of the relative movement between nipple 54 and the ends of band 14. There is no such requirement at the upper nipple 55 which is illustrated in Figure 4.

Figure 7:
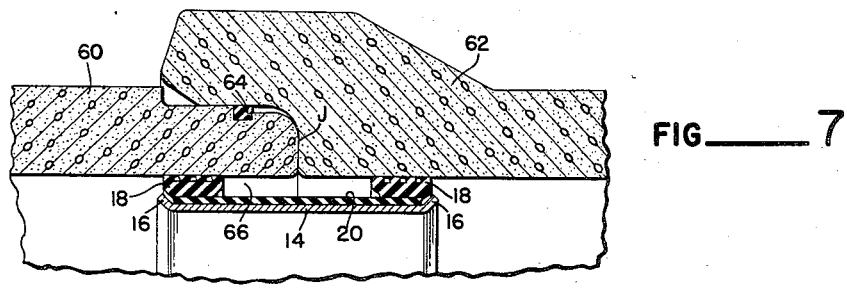
Figure 7 is a fragmentary cross-sectional view through a section of concrete pipe showing the seam joint.

The normal use of the expander arrangement follows the showing generally of Figure 7 in which the joining concrete pipe sections 60 and 62 have coacting end portions and are provided with a rubber sealing gasket 64. Gasket 64 and the annular sealing strips 18, one on each side of joint J create and seal the water chamber 66, which is annular around the inside of the concrete pipe sections.

There are certain conditions, however, when the two joining concrete pipes may have a substantial variation in their inside diameters, as is illustrated in Figure 11. Here the belled portion of a pipe 62 may be considered as normal, and the joining pipe 61 considered to have a lesser diameter or an irregularity due to error in manufacture and in order to seal the annular water chamber 66 it is necessary that the sealing strips 18 be supported on different diameters so that the sealing strips will make an adequate seal. This condition will call for a minor distortion in the sealing sheet 20, referred to in this view, Figure 11, as 21. The means to achieve this two diameter support of the sealing strips is illustrated in a modified form of the device in Figures 9 and 10. Essentially it consists of two bands 14a and 14b. Each of these will be provided with the conventional turnbuckle and toggle arrangement as previously explained. To each of the two bands 14a and 14b a plurality of coacting lugs 71 are provided. These lugs, one of each pair secured to the separate bands, have a common bolt 72. One of the lugs 71 of each pair, further, is provided with a slot as 74 so that the bolt 72 may be adjustably positioned in accordance with the amount of difference in diameter between the two joining pipe sections. It is of course necessary to operate two toggle units, as the two bands are naturally separate, and they should be operated together so that the sealing sheet 21 will not be distorted. As there is still only one water chamber as 66 there needs to be only one set of nipples as 54 and 55.

*Method of operation*

In using my present equipment the band 14 and its associated parts are put in place in the joint to be tested and with the sealing sheet 20 substantially centered on the seam or joint J. This places the two sealing strips 18 back somewhat from the end margins of the pipes insuring a good seating for the sealing means. The band is now expanded by the toggle means, which should be adjusted by means of the turnbuckle or possibly by the adjusting anchor arrangement 32 so that adequate pressure will be applied to the band to insure that it will form an adequate contact entirely around the joint and insure that there will be no leakage past the sealing strips 18 when the joint is placed under pressure test. The unit will conform substantially to the showing of Figure 12 when it is setup ready for testing a seam. It has been found desirable to use air pressure, preferably manually pumped up at the time the tests are made, so that accurate low pressures can be maintained throughout the test. It has been found that air, being elastic, or compressible is an excellent medium for creating and maintaining relatively low pressures.

Figure 8:
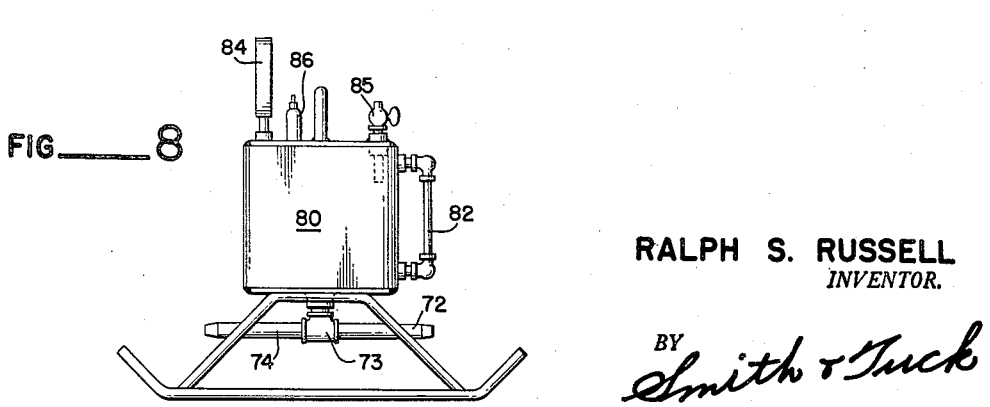
Figure 8 is a side elevation of a pressure means employed to place gaseous pressure upon the water as it is used in testing a seam.

To achieve my hydro-pneumatic testing arrangement I couple the water hose 70 to the lower nipple 54 which communicates with the water chamber 66. To the upper nipple 55, also communicating with the water chamber, I attach a valve as 69 so that it provides a venting means which can be closed when the chamber 66 is entirely filled with water. The water hose, used as a matter of convenience, is normally employed in two parts, the part connected to the chamber as 70 and the water supply portion 78. These two hose portions are joined by the pipe fittings, probably best illustrated in Figure 8, in which hose 70 is coupled to pipe 72 which in turn is coupled to a standard T fitting 73. A second pipe nipple 74 is screwed into T 73 and shutoff valve 76 is then secured to nipple 74 and in turn the water supply hose 78 is coupled to valve 76. This arrangement makes it possible to fill the testing system with the desired amount of water and then to shut off the water pressure from hose 78 permitting the building up of the desirable air pressure, using tank 80 as the accumulater and storage unit. T 73 is coupled to the interior of tank 80 so that water may be taken in or expelled from tank 80 as required. In order to carry out the tests it has been found desirable to provide tank 80 with a water sight gauge glass 82, a low reading pressure gauge 84, a tank venting means, as the pet cock 85, and a fitting 86 adapted to receive the hose of a hand air pump. Normally this fitting is a complete standard inner tube valve and stem assembly.

To start the test, water is taken in under pressure from hose 78 through a conduit or hose 70 and into the water chamber 66. In order to fill the water chamber, the air of the chamber is vented from valve 69, which normally should be at the high point of the test equipment so that all the air can be expelled. Water can then be taken into tank 80 by venting out the contained air through pet cock 85 until the water reaches the desired height in the gauge glass 82. At this point valve 76 is closed to prevent any build-up of pressure from the water supply lines, which of course would immediately build up when the vents, as valves 69 and 85, are both closed. The operator then mans the hand pump 88 and pumps up the desired pressure as indicated on the low reading gauge dial 84. The water chamber 66 will now be entirely filled with water under the indicated pressure. Any leakage of any appreciable amount will be evidenced by the actual water appearing on the outside of the joint. However, the water gauge glass 82 and the pressure gauge 84 also give visual indication of water leakage. If the reading on gauge 84 drops during a certain timed period it is known that the joint leaks and the approximate size of the leak. The leak can then be repaired. The water dropping in the gauge glass gives a visual indication of the leakage, also.

This present apparatus gives a very trustworthy test of the actual joint after it has been put in place and it achieves this without any disturbing of the various pipe joints that may comprise a line. This is believed to be a very worth-while improvement over the more general methods of testing pipe which has been put in place but before the dirt removed has been backfilled.

It is believed that it will be clearly apparent from the above description and the disclosure in the drawings that the invention comprehends a novel construction of a seam tester for concrete pipe.

Having thus disclosed the invention, I claim:

1. A sewer pipe seam tester, comprising: an adjustable metal band adapted to fit inside a pipe joint to be tested; toggle operating and locking means including an operating lever for controlling the effective diameter of the circle formed by said band; a sealing sheet of resilient and impervious material disposed on the outer surface of said metal band; annular sealing strips of resilient and impervious material disposed on the outer surface of said sealing sheet and adjacent each edge of the same; said sealing sheet and said sealing strips adapted to form with the inner surface of the pipe under test, an annular water chamber substantially centered of the seam of two abutting pipe sections whose joint is to be tested; water supply and air escape fittings secured to said sealing sheet and communicating with said water chamber; a water supply hose operatively secured to said water supply fitting and to a source of water; a combined water and air pressure tank coupled to said hose intermediate its ends; said pressure tank having water level indicating means and a pressure indicating gauge; vent means and conduit means for coupling said pressure tank to a source of air under pressure; manually controlled means for supplying air under pressure to said tank and to thus establish the test pressure on the water in said water chamber when a sewer pipe seam is being tested and valve means adapted to close said water supply hose between said tank and the water supply source.

2. A sewer pipe seam tester, comprising: a resilient metal band having its ends overlapping, adapted to form a circle inside a pipe joint to be tested; a sealing sheet of resilient and impervious material disposed on the outer surface of said metal band; annular sealing strips of resilient and impervious material disposed on the outer surface of said sealing sheet and on the two edges of the same; said sealing sheet and said sealing strips adapted to form an annular water chamber substantially centered of the seam of two abutting pipe sections whose joint is to be tested; means for changing the effective diameter of the circle formed by said band and adapted to compress said sealing strips against the interior surface of the pipe being tested; water supply and air escape fittings secured to said sealing sheet and communicating with said water chamber; a water supply means operatively secured to said water supply fitting and to a source of water; a pressure control tank coupled to said water supply means and to said water chamber; said pressure tank having water level indicating means and a pressure indicating gauge; vent means and conduit means for coupling said pressure tank to a source of air under pressure; controlled means for supplying air under pressure to said tank and to thus establish the pressure on the water in said water chamber when a sewer pipe seam is being tested; and valve means adapted to close said water supply means between said tank and the source of water.

3. A sewer pipe joint tester, comprising: an adjustable and resilient metal band adapted to form a circle inside a pipe joint to be tested; toggle adjusting means including an operating lever for controlling the effective diameter of the circle formed by said band and having an adjustable anchor giving stepped variations in the diameters that may be served by said band; a sealing sheet of resilient and impervious material disposed on the outer surface of said metal band; annular sealing strips of resilient and impervious material fixedly secured on the outer surface of said sealing sheet and on the two edges of the same; said sealing sheet and said sealing strips adapted to form an annular water chamber substantially centered of the seam of two abutting pipe sections whose joint is to be tested; water supply and air escape fittings secured to said sealing sheet and communicating with said water chamber; a water supply hose operatively secured to said water supply fitting and to a source of water; a combined water and air pressure tank coupled to said hose intermediate its ends; said pressure tank having vent means, water level indicating means and a pressure indicating gauge; conduit means for coupling said pressure tank to a source of air under pressure; and a manually operated pump for supplying air under pressure to said tank and to thus establish the pressure on the water in said water chamber when a sewer pipe seam is being tested.

4. A sewer pipe seam tester, comprising: an expander formed of two metal bands adapted to fit inside a pipe joint to be tested; dual toggle means, each including an operating lever, for controlling the effective diameter of the circle formed by each of said bands; a sealing sheet of resilient and impervious material disposed on the outer surface of said metal band and adapted to form a stepped surface to accommodate the different diameters of said expander bands; annular sealing strips of resilient and impervious material disposed on the outer surface of said sealing sheet and on the two edges of the same and adapted to seal pipes having different internal diameters; said sealing sheet and said sealing strips adapted to form a single annular water chamber substantially centered of the seam of two abutting pipe sections whose joint is to be tested; water supply and air escape fittings secured to said sealing sheet and communicating with said water chamber; a water supply hose operatively secured to said water supply fitting and to a source of water; a combined water and air pressure tank coupled to said hose, said pressure tank having water level indicating means and a pressure indicating gauge; a source of air under pressure coupled to said pressure tank and to thus establish the pressure on the water in said water chamber when a sewer pipe seam is being tested and valve means adapted to close said water supply hose between said tank and the source of water.

References Cited in the file of this patent

UNITED STATES PATENTS

| 1,196,828 | Weatherson | Sept. 5, 1916 |
| 1,788,845 | Reynolds | Jan. 13, 1931 |

FOREIGN PATENTS

| 229,048 | Great Britain | Feb. 19, 1925 |